United States Patent [19]
Ishino et al.

[11] Patent Number: 4,939,195

[45] Date of Patent: Jul. 3, 1990

[54] SELF-EXTINGUISHING POLYMER COMPOSITION

[75] Inventors: Iwao Ishino; Nobuhiro Usami; Yayoi Ishikawa, all of Yokkaichi, Japan

[73] Assignee: Mitsubishi Petrochemical Co., Ltd., Tokyo, Japan

[21] Appl. No.: 380,519

[22] Filed: Jul. 17, 1989

[30] Foreign Application Priority Data

Jul. 25, 1988 [JP] Japan .................................. 63-185187

[51] Int. Cl.$^5$ ............................................... C08K 5/55
[52] U.S. Cl. .................... 524/185; 524/436; 524/437; 524/912
[58] Field of Search ............... 524/436, 437, 185, 912; 525/389; 528/8

[56] References Cited

U.S. PATENT DOCUMENTS

| | | | |
|---|---|---|---|
| 3,852,314 | 12/1974 | Hamanaka et al. | 524/183 |
| 4,851,463 | 7/1989 | Opsahl et al. | 524/321 |

FOREIGN PATENT DOCUMENTS

| | | | |
|---|---|---|---|
| 2730302 | 1/1978 | Fed. Rep. of Germany | 528/8 |
| 53-90361 | 8/1978 | Japan | 524/183 |
| 61-238839 | 10/1986 | Japan | 524/185 |
| 62-232482 | 10/1987 | Japan | 524/185 |

*Primary Examiner*—Veronica P. Hoke
*Attorney, Agent, or Firm*—Oblon, Spivak, McClelland, Maier & Neustadt

[57] ABSTRACT

A self-extinguishing polymer composition consisting of 20 to 70% by weight of thermoplastic resin or elastomer (A), 80 to 30% by weight of a hydroxide of aluminum and/or magnesium (B), and a polymeric charge-transfer type complex (C) in an amount of 0.01 to 10 parts by weight relative to 100 parts by weight of (A) and (B).

4 Claims, No Drawings

SELF-EXTINGUISHING POLYMER COMPOSITION

BACKGROUND OF THE INVENTION

The present invention relates to a self-extinguishing polymer composition, and particularly to a self-extinguishing polymer composition which is suitable for use in the fields of extrusion molded products such as wire coatings and pipes and injection molded products such as domestic electrical containers and electrical equipment connectors, and which has an extremely high degree of non-flammability and significantly improved practicability with respect to mechanical properties and acid resistance.

In recent years, the demand for imparting flame retardance to materials used for wire cables has significantly increased.

One example of a method of imparting flame retardance to thermoplastic resin or elastomers is a method in which antimony oxide and a halide are mixed in the raw materials used. Self-extinguishing compositions formed by this method, however, involve the danger of generating harmful gases during a fire. For this reason, hydrated metal compounds such as aluminum hydroxide or magnesium hydroxide or compounds thereof with magnesium carbonate have attracted attention because they generate no harmful gases and involve no problem with respect to toxicity as additives.

This method in which flame retardance is imparted to a thermoplastic resin or elastomer by compounding a hydrated metal compound therewith is already known. It is also known that flame retardance can be improved by adding a fine carbon powder to a composition containing a thermoplastic resin or elastomer and a hydrated metal compound (Japanese Patent Laid-Open No. 46341/1976).

Although the above-mentioned compound system is provided with a satisfactory level of flame retardance, there has been a problem in that it is very difficult to obtain a composition having a satisfactory level of practicability because whitening occurs in a resin composition having the above-described composition when any external force is applied thereto and because the resin composition exhibits a low level of acid resistance.

SUMMARY OF THE INVENTION

In the present invention, the aforementioned problem is resolved by compounding a boron compound with conventional inorganic frame retardants.

The present invention provides a self-extinguishing polymer composition consisting of 70 to 20% by weight of the component (A) described below, 30 to 80% by weight of the component (B) described below and the component (C) described below in an amount of 0.01 to 10 parts by weight relative to 100 parts by weight of the total amount of the components (A) and (B);

(A): one or more thermoplastic resins or elastomers derived from an α-olefin polymer;

(B): a hydroxide of aluminum and/or magnesium;

(C): a boron compound (polymeric charge-transfer type complex) which is a reaction product having a ratio of boron atoms to basic nitrogen atoms of 1:1 and is produced by reaction between at least one tertiary amine having at least one hydroxyl group and 5 to 82 carbon atoms in total and at least one semi-polar organic boron polymer compound expressed by the following Formula (I):

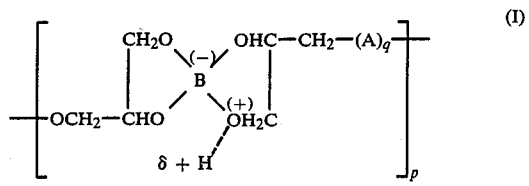

[wherein q denotes 0 or 1 and, when q=1, A denotes a —$(X)_l$—$(Y)_m$—$(Z)_n$—group and p is 10 to 1000, in Formula (I), X and Z each denoting an oxygencontaining hydrocarbon group having one terminal ether residue and 100 or less carbon atoms in total, Y denoting a

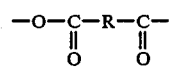

group (wherein R represents a hydrocarbon group having 1 to 82 carbon atoms) or a

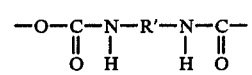

group (wherein R' represents a hydrocarbon group having 2 to 13 carbon atoms), l, m and n each denoting 0 or 1.]

DETAILED DESCRIPTION OF THE INVENTION

(A) Thermoplastic resins or elastomers

Examples of thermoplastic resins or elastomers that may be used as the above-described component (A) in the present invention include olefin polymers such as homopolymers of α-olefins such as ethylene, propylene, butene, methylpentene, hexene and the like; copolymers of these olefins; and copolymers of these α-olefins with 50% by weight or less of other comonomers.

Of these polymers, resins or elastomers of ethylene- or propylene-type polymers such as polyethylene, polypropylene, ethylene-propylene copolymer rubber, ethylene-propylenediene copolymer rubber, ethylene-propylene copolymer resins, ethylene-vinyl acetate copolymer resins, ethylene-methyl acrylate resins, ethylene-methyl methacrylate copolymer resins, ethylene-ethyl acrylate resins are particularly preferable from the viewpoints of their molding properties and uniform dispersibility.

Of various olefinic polymer resins, linear ethylene polymers with density of 0.850 to 0.915 g/cm$^2$, ethylene polymers containing 1 to 40% by weight of vinyl acetate and having melt flow rates (MFR) of 0.05 to 50 g/10 minutes and ethylene polymers containing 1 to 40% by weight of alkyl acrylate or alkyl methacrylate and having MFR of 0.05 to 50 g/10 minutes are particularly preferable from the viewpoint of remarkableness of the effect of the invention.

(B) Hydrated metal compound

The hydrated metal compound used as component (B) in the present invention is aluminum hydroxide and/or magnesium hydroxide. As occasion demands, a compound containing these metal compounds and 30% by weight or less, preferably 5 to 20% by weight, of magnesium carbonate may be used. The average particle size of each metal compound is generally 0.1 to 20 μm, preferably 0.2 to 2 μm, and an average particle size of 0.5 to 1 μm is particularly preferable from the viewpoint of dispersibility. Metal compounds which are subjected to surface treatment may be used.

Of these metal compounds, magnesium hydroxide is particularly preferable from the viewpoint of practicability.

In addition, the use of magnesium hydroxide which was subjected to surface treatment using stearic acid or a metal salt of stearic acid is preferable because it enables the achievement of molded products exhibiting excellent physical properties and low levels of bleeding of magnesium carbonate, as well as having good appearance.

(C) Boron compound (polymeric charge transfer type complex)

The particular boron compound (polymeric charge-transfer type complex) used as component (C) in the present invention is produced by the following reaction:

At least one tertiary amine having at least one hydroxyl group and 5 to 82 carbon atoms in total (referred to as "a given tertiary amine" hereinafter) is reacted with at least one semi-polar organic boron polymer compound (referred to as "a given semi-polar organic boron polymer compound" hereinafter) obtained by the following reaction (a), (b) or (c):

(a) Triesterification reaction between 1 mole of the total of at least one compound expressed by the following Formula (II):

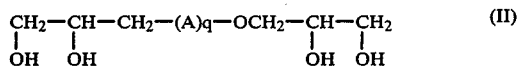

[wherein q denotes 0 or 1 and, when q=1, A denotes a $-(X)_l-(Y)_m-(Z)_n-$ group, wherein X and Z each denoting an oxygen-containing hydrocarbon group having one terminal ether residue and 100 or less carbon atoms in total, Y denoting a

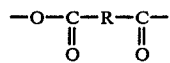

group (wherein R denotes a hydrocarbon group having 1 to 82 carbon atoms) or a

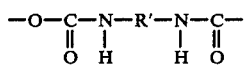

group (wherein R' denotes a hydrocarbon group having 2 to 13 carbon atoms) and l, m, n each denoting 0 or 1] and 1 mole of boric acid or a triborate of a lower alcohol having 4 or less carbon atoms or 0.5 mole of boric anhydride;

(b) Polyethyerification reaction using at least one di(glycerin) borate or diol having a di(glycerin) borate residue at an intermediate position in its molecule and 206 or less carbon atoms in total;

(c) Reaction between 1 mole of the total of at least one di(glycerin) borate or diol having a gi(glycerin) borate residue at in intermediate position and 206 or less carbon atoms in total in its molecule and 1 mole of the total of at least one dicarboxylic acid having 3 to 48 carbon atoms (referred to as "a given dicarboxylic acid" hereinafter), an ester of a lower alcohol having 4 or less carbon atoms and a given dicarboxylic acid and a halide of a given dicarboxylic acid or a diisocyanate having 4 to 15 carbon atoms (referred to as "a given diisocyanate" hereinafter). The reaction between "a given tertiary amine" and "a given semi-polar organic boron polymer compound" is carried out wherein the materials are charged in a closed type or open-type reactor so that a ratio of boron atoms to basic nitrogen atoms is 1:1 at a temperature of 20° to 200° C., preferably 50° to 150° C., and under a normal pressure. The reaction proceeds more easily if a polar solvent such as an alcohol, ether, ketone or the like is caused to coexist with the materials.

Examples of compounds expressed by Formula II which may be used as raw materials of the reaction (a) include diglycerin, di(glycerin) malonate, di(glycerin) maleate, di(glycerin) adipate, di(glycerin) terephthalate, di(glycerin) dodecanate, poly(9 moles)-oxyethylene di(glycerin) ether, di(glycerin) tolylene dicarbamate, di(glycerin) methylene bis(4-phenylcarbamate) and the like.

Examples of given dicarboxylic acids which may be used in the reaction (c) include malonic acid, maleic acid, succinic acid, adipic acid, sebacic acid, phthalic acid, terephthalic acid, dodecanedicarboxylic acid, dimer acid derived from linoleic acid, dodecyl maleate, dodecenyl maleate, octadecyl maleate, octadecenyl maleate, maleic acid to which a polybutenyl group with an average degree of polymerization of 20 is jointed and the like.

Examples of given diisocyanates include ethylene diisocyanate, hexamethylene diisocyanate, tolylene diisocyanate, methylene bis(4-phenylisocyanate) and the like.

Examples of given tertiary amines which may be reacted with given semi-polar organic boron polymer compounds include diethyl hydroxymethylamine, dimethyl 2-hydroxypropylamine, methyl di(2-hydroxyethyl)amine, tri(2-hydroxyethyl)amine, hydroxymethyl di(2-hydroxyethyl)amine, dibenzyl 2-hydroxypropylamine, cyclohexyl di(2-hydroxyethyl)amine, ethylene oxide (1 to 25 moles) addition products of di(hexadecyl)amine, propylene oxide (1 to 26 moles) addition products of monobutylamine and the like.

Typical examples of boron compounds (polymeric charge-transfer type complex) that may be used in the present invention are listed in Table 1.

With respect to the compounding ratio of the necessary components used in the present invention, the proportion of the component (A) is 70 to 20% by weight, preferably 65 to 35% by weight, of the total amount of the components (A) and (B), and the proportion of the necessary component (C) is 0.01 to 10 parts by weight, preferably 0.05 to 5 parts by weight, more preferably 0.05 to 2 parts by weight, relative to 100 parts by weight of the total amount of the components (A) and (B). If the proportion of the component (C) is too small, resistance to mechanical whitening and acid resistance cannot be improved, while, if the proportion is too large, molding properties significantly deteriorate.

TABLE 1
| Typical Example | Structural Formula |
|---|---|
| (1) | 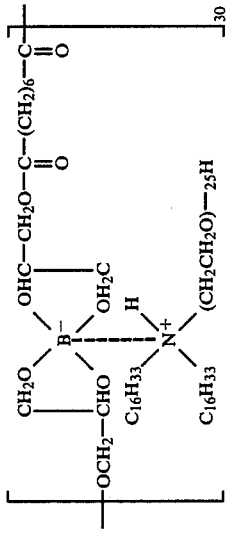 |
| (2) | 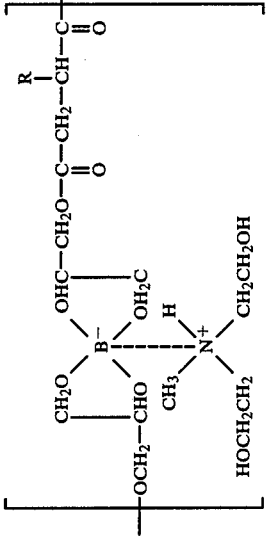<br>R denotes a polybutene residue having an average polymerization degree of 20. |
| (3) | 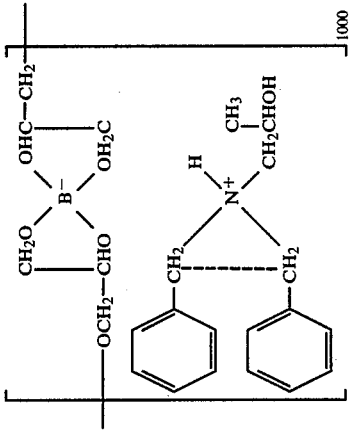 |

TABLE 1-continued
| Typical Example | Structural Formula |
|---|---|
| (4) | 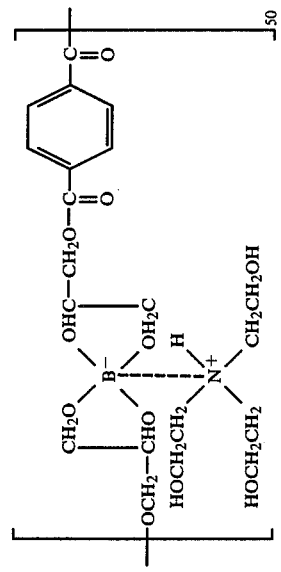 |
| (5) | 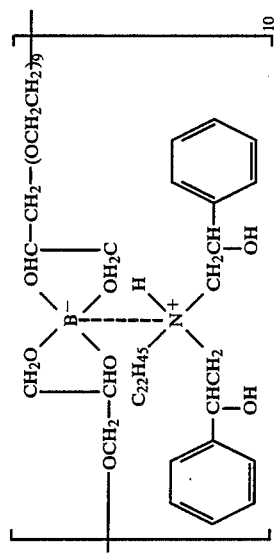 |
| (6) | 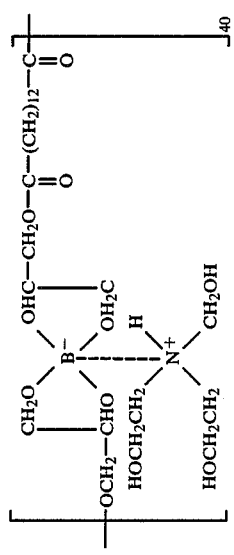 |

TABLE 1-continued
| Typical Example | Structural Formula |
|---|---|
| (7) | 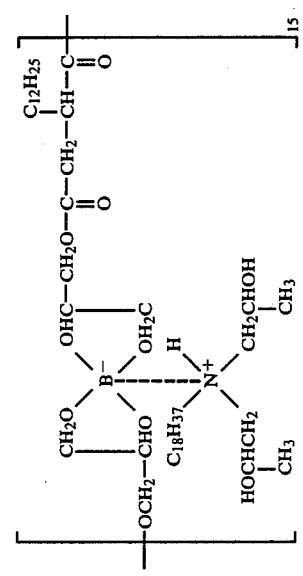 |
| (8) | 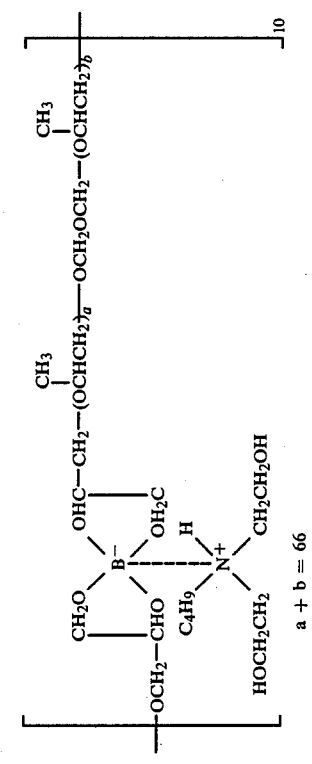 |
| (9) | 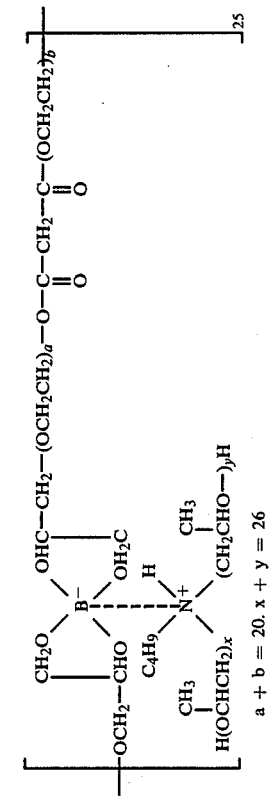 |

TABLE 1-continued

Typical Example — Structural Formula (10): Complex structure with boron-nitrogen coordination, containing OHC-CH₂-O-C(=O)-(C₃₄H₆₈)-C(=O) linkage, repeating unit ×300; $x + y = 10$ (11): Complex structure with boron-nitrogen coordination, containing OHC-CH₂-O-C(=O)-N(H)-C₂H₄-N(H)-C(=O) linkage and cyclohexyl group, repeating unit ×100

(12): Complex structure with boron-nitrogen coordination, containing phenyl urethane groups, repeating unit ×150; $x + y + z = 26$ TABLE 1-continued

| Typical Example | Structural Formula |
|---|---|
| (13) | $\left[ \begin{array}{c} \text{OHC—CH}_2\text{—(OCH}_2\text{CH}\frac{1}{32}\text{(OCH}_2\text{CH}_2\frac{1}{7}\text{O—C—N}-\text{CH}_2-\text{N—C—(OCH}_2\text{CH}_2\frac{1}{7}\text{(OCHCH}_2\frac{1}{32} \\ \text{OCH}_2\text{—CHO} \quad \text{C}_{12}\text{H}_{25} \quad \text{(CH}_2\text{CH}_2\text{O—)}_x\text{H} \\ \text{H(OCH}_2\text{CH}_2\text{—)}_y \\ x + y = 15 \end{array} \right]_{20}$ structure with B⁻···N⁺ complex |
| (14) | $\left[ \begin{array}{c} \text{OHC—CH}_2\text{—O—C—CH}=\text{CH—C}=\text{O} \\ \text{OCH}_2\text{—CHO} \quad \text{C}_{16}\text{H}_{33} \quad \text{CH}_2\text{—CH—OH} \\ \text{CH}_2\text{—CH—OH} \end{array} \right]_{100}$ structure with B⁻···N⁺ complex with benzyl groups |

(D) Additional components

It is possible to add other additional components to the composition of the present invention within the range which permits no deterioration in the effect of the present invention. Examples of such additional components include an antioxidant, a copper inhibitor, a neutralizer, a ultraviolet absorber, a coloring agent, a crosslinking agent, an inorganic filler and the like.

Compounding of a fine carbon powder as an additional component has the effect of further improving the non-flammability of the composition, as well as enabling the achievement of a composition exhibiting good resistance to mechanical whitening and acid resistance. Carbon black, activated carbon, graphite or the like which is electrically conductive and used as pigments may be used as a fine carbon powder. The fine carbon powder preferably has an average particle size of 1 μm to 10 μm and contains at least 70% by weight of carbon. Carbon black having a uniform particle size is preferable from the viewpoint of uniform dispersibility.

Furthermore, addition of a silicone compound such as dimethylpolysiloxane, silicon diol, amino-modified silicones oil, mercapto-modified silicone oil, siliconediamine or the like enables the achievement of a composition exhibiting a high level of non-flammability and good resistance to mechanical whitening and acid resistance.

The composition of the present invention can be produced by compounding the aforementioned necessary components (A), (B) and (C) and, if required, additional components and then kneading the thus-formed compound by a normal kneading method such as an extruder, roll, Banbury mixer or the like. During the production, although any desired compounding order can be employed, it is preferable to use a method in which all the components are mixed in a dry blending manner and the kneaded. It is particularly preferable to use a method in which the component (B) is subjected to surface treatment using the component (C), then mixed with the other components in a dry blending manner and then kneaded.

Although molding is generally performed by using pellets of the composition of the present invention, molding can also be performed after mixing or during mixing where a master batch or dry blending method is adapted.

DESCRIPTION OF THE PREFERRED EMBODIMENTS

(EXAMPLES)

The boron compound used in the examples described below is Typical Example (1) shown in Table 1 and produced by the following method:

Production of Boron Compound 1 mole of di(glycerin) borate and 1 mole of adipic acid were charged in a four-necked flask provided with a stirrer, a thermometer, a nitrogen gas inlet tube and a water measuring tube, and reaction was effected under a stream of nitrogen gas at 220° C. to 230° C. for 4 hours until 2 moles of water was removed. After an increase in the melt-viscosity had been recognized, the reaction product was cooled to 70° C., and methyl ethyl ketone was charged in an amount which was substantially the same as that of the reaction product to form a uniform solution. 1 mole of poly(25 moles)-oxyethylene dihexadecylamine was then charged to the resultant solution, followed by reaction at 70° to 75° C. for 1 hour. After the reaction, methyl ethyl ketone used as a diluting solvent was distilled off to the outside of the system at 120° to 130° C. over the time of 2 hours under a reduced pressure of 150 mmHg to obtain the boron compound (1).

Examples 1 to 14 and Comparative Examples 1 to 3

Each of the compositions having the compounding ratios shown in Table 2 was produced by kneading at 160° C. for 20 minutes using a laboratory plastomill.

The oxygen index (LOI) of each of the compositions obtained was evaluated in accordance with the method of JIS K7201, and the tensile strength and tensile elongation were evaluated in accordance with JIS K6760. The resistance to whitening resistance to acid and bleeding were evaluated by the following method:

(Whitening)

A sheet having a thickness of 1 mm was bent at an angle of 120 degrees, and the appearance of the sheet was visually observed. The decision of evaluation was made using the following criteria:
excellent: no whitening or substantially no whitening
good: a low degree of whitening
poor: a high degree of whitening

(Acid resistance)

A sheet having a thickness of 1 mm was soaked in a 10% hydrochloric acid at 50° C. for 72 hours, and the retention rate of weight was then measured.

(Bleeding)

A sheet having a thickness of 1 mm was allowed to stand in an atmosphere of water vapor saturated with carbon dioxide gas at room temperature for 3 days and then dried. The appearance of the sheet was then visually observed. The decision of evaluation was made by using the following criteria:
excellent: no bleeding or substantially no bleeding of magnesium carbonate or aluminum carbonate
good: a low degree of bleeding
poor: a high degree of bleeding The abbreviations of components shown in Table 2 respectively represent the following substances:
PE: Polyethylene having a MFR value of 1.0 g/10 minutes and a density of 0.90 g/cm$^3$
EMA: Ethylene-ethyl acrylate polymer having a MFR value of 2.0 g/10 minutes and containing 18% by weight of ethyl acrylate
Mg(OH)$_2$[I]: Mg(OH)$_2$ (average particle size, 0.6 μm) subjected to surface treatment with 1 part by weight of the boron compound relative to 100 parts by weight of Mg(OH)$_2$
Mg(OH)$_2$[II]: Mg(OH)$_2$ (average particle size, 0.6 μm) subjected to surface treatment with 1 part by weight of the boron compound and 1 part by weight of sodium stearate relative to 100 parts by weight of Mg(OH)$_2$
Mg(OH)$_2$[III]: Mg(OH)$_2$ (average particle size, 0.6 μm) subjected to surface treatment with 0.5 part by weight of the boron compound and 1 part by weight of sodium stearate relative to 100 parts by weight of Mg(OH)$_2$
Mg(OH)$_2$ [IV]: Mg(OH)$_2$ (average particle size, 0.6 μm) subjected to surface treatment with 0.1 part by weight of the boron compound and 1 part by weight of sodium stearate relative to 100 parts by weight of Mg(OH)$_2$ Mg(OH)$_2$[V]: Mg(OH)$_2$ having an average particle size of 0.6 μm and subjected to no surface treatment Mg(OH)$_2$[VI]: Mg(OH)$_2$ (average particle size, 0.6 μm) subjected to surface treatment with 1 part by weight of sodium stearate relative to 100 parts by weight of Mg(OH)$_2$ Al(OH)$_3$: aluminium hydroxide having an average particle size of 0.6 μm and subjected to no surface treatment Carbon: Carbon black having an average particle size of 19 μm and a specific surface area of 140 m$^2$/g Silicon: Silicon diol having viscosity of 55 cp, a refractive index of 1.41 and a specific gravity of 0.96

PbSt: Lead stearate ally mixed in conventional flame retardant compositions enables the achievement of a self-extinguishing composition exhibiting significantly improved properties such as nonflammability, tensile strength, tensile elongation, control of whitening, acid resistance and so forth. Thus, the practical performance which has been a problem of conventional composition is significantly improved.

What is claimed is:

1. A self-extinguishing polymer composition characterized by consisting of 70 to 20% by weight of the component (A) described below, 30 to 80% by weight of the component (B) described below and the component (C) described below in an amount of 0.01 to 10 parts by weight relative to 100 parts by weight of the total amount of said components (A) and (B).

(A): one or more thermoplastic resins or elastomers derived from an α-olefin polymer

TABLE 2

| Example | Comparative Example | Polymer Type | Polymer Content | Hydrated metal compound Type | Hydrated metal compound Content | Boron compound content | Carbon content | Silicone compound Type | Silicone compound Content | PbSt Content |
|---|---|---|---|---|---|---|---|---|---|---|
| 1 | | PE | 47 | Mg(OH)$_2$[I] | 53 | (0.53)* | — | — | — | — |
| 2 | | " | " | Mg(OH)$_2$[II] | " | " | — | — | — | — |
| 3 | | EMA | " | " | " | " | — | — | — | — |
| 4 | | PE | " | " | " | " | 2.5 | — | — | — |
| 5 | | " | " | " | " | " | — | silicon | 2.0 | — |
| 6 | | " | " | " | " | " | 2.5 | " | " | — |
| 7 | | " | " | " | " | " | " | " | " | 0.5 |
| 8 | | " | 40 | " | 60 | " | " | " | " | " |
| 9 | | " | " | Mg(OH)$_2$[III] | " | (0.30)* | " | " | " | " |
| 10 | | " | " | Mg(OH)$_2$[IV] | " | (0.06)* | " | " | " | " |
| 11 | | " | " | Al(OH)$_3$ | " | 0.50 | " | " | " | " |
| 12 | | " | 47 | Mg(OH)$_2$[V] | 53 | " | — | — | — | — |
| 13 | | " | " | " | " | " | 2.5 | silicon | 2.0 | 0.5 |
| 14 | | " | " | Mg(OH)$_2$[VI] | " | " | " | " | " | " |
| | 1 | " | " | " | " | — | — | — | — | — |
| | 2 | " | " | " | " | — | 2.5 | silicon | 2.0 | 0.5 |
| | 3 | " | 40 | " | 60 | — | " | " | " | " |
| | 4 | " | 47 | Mg(OH)$_2$[V] | 53 | — | — | — | — | — |

| Example | Comparative Example | LOI | Whitening | Acid resistance % | Tensile strength kg/mm2 | Tensile elongation % | Bleeding |
|---|---|---|---|---|---|---|---|
| 1 | | 28 | good | 90 | 100 | 650 | good |
| 2 | | 28 | good | 97 | 100 | 650 | excellent |
| 3 | | 28 | good | 97 | 100 | 650 | excellent |
| 4 | | 28 | excellent | 97 | 100 | 650 | excellent |
| 5 | | 28 | good | 97 | 120 | 700 | excellent |
| 6 | | 38 | excellent | 97 | 120 | 700 | excellent |
| 7 | | 42 | excellent | 97 | 130 | 700 | excellent |
| 8 | | 45 | good | 90 | 120 | 600 | good |
| 9 | | 45 | good | 90 | 120 | 600 | good |
| 10 | | 45 | good | 70 | 120 | 600 | good |
| 11 | | 42 | good | 90 | 110 | 600 | excellent |
| 12 | | 28 | good | 60 | 100 | 650 | good |
| 13 | | 42 | excellent | 60 | 130 | 700 | excellent |
| 14 | | 42 | excellent | 60 | 130 | 700 | excellent |
| | 1 | 28 | poor | 50 | 100 | 650 | good |
| | 2 | 42 | good | 50 | 130 | 700 | good |
| | 3 | 45 | poor | 45 | 120 | 600 | good |
| | 4 | 28 | poor | 50 | 100 | 650 | poor |

*The numerical values in each parenthesis represents the amount used for surface treatment of a hydrated metal compound.
Content: in terms of parts by weight As can be seen from Table 2, the compositions of Examples 1 to 14 which contained hydrated metal salts subjected to surface treatment with the boron compound exhibit excellent properties with respect to resistance to whitening and acid resistance, as compared with the compositions of Comparative Examples 1 to 3 which contained no boron compound.

In the present invention, the use of a particular amount of a particular boron compound together with hydrated metal compounds of the type which is gener- (B): a hydroxide of aluminum and/or magnesium
(C): a polymeric charge-transfer type complex which is a reaction product having a ratio of boron atoms to basic nitrogen atoms of 1:1 and is produced by reaction between at least one tertiary amine having at least one hydroxyl group and 5 to 82 carbon atoms in total and at least one semi-polar organic boron polymer compound expressed by the following Formula (I):

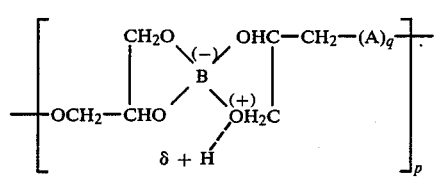

[wherein q denotes 0 or 1 and, when q=1, A denotes a —(X)$_l$—(Y)$_m$—(Z)$_n$—group and p is 10 to 1000, in Formula (I), X and Z each denoting an oxygen-containing hydrocarbon group having one terminal ether residue and 100 or less carbon atoms in total, Y denoting a

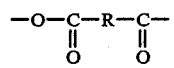

group (wherein R represents a hydrocarbon group having 1 to 82 carbon atoms) or a

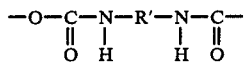

group (wherein R' represents a hydrocarbon group having 2 to 13 carbon atoms), l, m and n each denoting 0 or 1].

2. A composition according to claim 1, wherein a content of the component (A) is 35 to 65% by weight relative to total amount of the components (A) and (B).

3. A composition according to claim 1, wherein a content of the component (C) is 0.05 to 5 parts by weight relative to 100 parts by weight of the total amount of the components (A) and (B).

4. A composition according to claim 1, wherein the thermoplastic resin is a polymer selected from a group consisting of polyethylene and ethylene-acrylicester copolymer.

* * * * *